(12) United States Patent
Pettersson et al.

(10) Patent No.: US 9,760,066 B2
(45) Date of Patent: Sep. 12, 2017

(54) OPTIMISATION OF A MATERIAL SEPARATION PROCESS

(75) Inventors: Jens Pettersson, Västerås (SE); Lars Ledung, Västerås (SE); Patrik Westerlund, Umeå (SE)

(73) Assignee: ABB Research Ltd., Zurich (CH)

( * ) Notice: Subject to any disclaimer, the term of this patent is extended or adjusted under 35 U.S.C. 154(b) by 1798 days.

(21) Appl. No.: 12/406,798

(22) Filed: Mar. 18, 2009

(65) Prior Publication Data
US 2009/0234496 A1 Sep. 17, 2009

Related U.S. Application Data

(63) Continuation of application No. PCT/EP2007/059790, filed on Sep. 17, 2007.

(30) Foreign Application Priority Data

Sep. 18, 2006 (EP) .................................... 06120828

(51) Int. Cl.
G05B 21/00 (2006.01)
G05B 13/04 (2006.01)

(52) U.S. Cl.
CPC .................................. G05B 13/048 (2013.01)

(58) Field of Classification Search
CPC ............ B65H 2220/01; B65H 2220/02; B65H 2301/4474; B65H 2301/4476; B65H 2301/321; B65H 2301/34; B65H 83/02; B01D 17/0217; B01D 21/0087; B01D 21/245; B01D 21/265; B01D 45/12; B01D 45/16; B01D 21/26; B01D 11/0203;

(Continued)

(56) References Cited

U.S. PATENT DOCUMENTS

| | | | |
|---|---|---|---|
| 5,798,917 | A | 8/1998 | Werbrouck |
| 6,733,662 | B2 * | 5/2004 | Pollock ........................... 210/97 |
| 2004/0260421 | A1 * | 12/2004 | Persson et al. ................ 700/128 |

FOREIGN PATENT DOCUMENTS

WO  03007103 A2  1/2003

OTHER PUBLICATIONS

Aldo Cipriani and Carlos Munoz, "A Dynamic Low-Cost Simulator for Grinding-Flotation Plants", Low Cost Automation, p. 267-272, Buenos Aires, Argentina, 1995, IFAC.

(Continued)

*Primary Examiner* — Dean Kwak
(74) *Attorney, Agent, or Firm* — Whitmyer IP Group LLC

(57) ABSTRACT

The invention concerns a method, device and computer program product for controlling a material separation process as well as to a material separating system. The material separating system comprises units separating desired material from undesired material, units measuring process output variables in the material separation process indicative of the degree of separation between desired and undesired material, a unit estimating the state of the process by applying the measured output variables and external constraints for a prediction time interval on a model of the material separation process, a unit optimising an objective function through maximising the recovery of the desired material in the separation process, which optimising provides at least one set point value for each input variable of the model, and at least one regulating unit regulating the separation process by using the set point value.

19 Claims, 2 Drawing Sheets

(58) Field of Classification Search
CPC .............. B01D 21/262; B01D 2221/10; B01D 2323/08; B01D 53/70; B01D 53/72; B01D 67/0004; B01D 67/0083; B01D 67/0086; B01D 67/009; B01D 71/42; B01D 15/02; B04C 3/06; B04C 5/13; B04C 5/24; B04C 7/00; F25J 2270/02; F25J 2270/04; F25J 3/0252; F25J 2200/78; F25J 2205/04; F25J 2205/30; F25J 2210/42; F25J 2270/904; F25J 3/0223; F25J 3/0261; F25J 2200/70; F25J 2200/72; F25J 2200/74; F25J 2200/76; F25J 2200/80; F25J 2210/12; F25J 2245/02; F25J 2270/24; F25J 3/0219; F25J 3/0233; F25J 3/0257; F25J 3/0285; B03B 9/04; B03B 7/00; B03B 9/00; C22B 60/026; C22B 21/0069; Y10S 514/825; Y10S 514/916; Y10S 62/92; Y10S 208/952; Y10S 271/903; Y10S 585/951; B01F 5/0682; B01F 5/0688; B01J 23/40; B01L 3/5021; B03C 1/30; B03C 3/14; B03D 1/01; B03D 1/014; B03D 1/021; B03D 1/06; B04B 2005/0471; B07C 1/025; B31B 19/90; B31B 2219/9016; C01B 15/029; C01B 2203/0465; C01B 2203/047; C01B 2203/048; C01B 25/405; C01B 3/28; C01B 3/344; C01B 3/506; C02F 1/04; C02F 1/441; C02F 1/444; C02F 1/52; C02F 2101/006; C02F 2101/163; C02F 9/00; C03C 15/00; C03C 17/02; C03C 23/00; C11B 1/04; C11B 1/08; C11B 3/04; D21B 1/12; D21B 1/14; D21B 1/32; G01N 15/042; G01N 2015/045; G01N 33/491; G02B 1/113; G02B 2207/107; G05B 13/02; G05D 1/00; G05D 1/0088; G06F 19/18; G06F 19/70
USPC ............ 700/44, 108, 128, 223, 271; 210/97; 702/127; 209/12.1, 162, 164, 168; 162/198, 263

See application file for complete search history.

(56) References Cited

OTHER PUBLICATIONS

International Preliminary Report on Patentability and Written Opinion; PCT/EP20071059790; Mar. 23, 2009; 6 pages.
International Search Report, PCT/EP2007/059790, Dec. 11, 2007, 2 pages.

\* cited by examiner

OPTIMISATION OF A MATERIAL SEPARATION PROCESS

CROSS-REFERENCE TO RELATED APPLICATIONS

The present application is a continuation of pending International patent application PCT/EP2007/059790 filed on Sep. 17, 2007 which designates the United States and claims priority from European patent application 06120828.6 filed on Sep. 18, 2006, the content of which is incorporated herein by reference.

FIELD OF THE INVENTION

The present invention relates to material separation processes. The invention more particularly relates to a method, device and computer program product for controlling a material separation process as well as to a material separating system.

BACKGROUND OF THE INVENTION

Industrial material separation processes, like for instance flotation processes, are multivariable and highly non-linear. They are therefore hard to control. Measurements made on the performance of the process furthermore often need the use of X-ray refractometry. X-ray refractometry equipment is highly expensive and therefore there is often a desire to keep the number of measurement points to a minimum, which makes the control process difficult to implement.

There do exist models of such processes that can be used in such control. One is for instance described by Aldo Cipriani and Carlos Munoz, in "A Dynamic Low-Cost Simulator for Grinding-Flotation Plants", Low Cost Automation, page 267-272, Buenos Aires, Argentina, 1995, IFAC.

However, most such models seem to be directed towards trying to control the grade of the concentrate and/or the tailings to desired set-points. Most plants do therefore seem to operate in regions far from their optimal condition.

In the field of pulp and paper production there has recently been provided an interesting control method. This method, which is a real time optimization control method, is described in WO 03/107103, where a dynamic model of the production process is provided. The document describes that a dynamic model can be optimised. However it does not really mention in which way the model should be optimised. It does only mention that there are trade-offs between different controlled output variables and that weighting can be used as a compromise between different competing targets.

There is therefore a need for a more efficient material separation process.

SUMMARY OF THE INVENTION

The present invention is therefore directed towards providing a more efficient control of a material separation process.

One object of the present invention is thus to provide a method for controlling a material separation process that makes the material separation process more efficient.

This object is according to a first aspect of the present invention achieved through a method for controlling a material separation process, comprising the steps of:

measuring at least one process output variable in said material separation process that is indicative of the degree of separation between a desired material and an undesired material, estimating the state of the process at a certain instant in time by applying the measured output variable and external constraints for a prediction time interval on a model of the material separation process, said model being based on at least one input variable that can be manipulated and said output variable, optimising an objective function that involves at least one predicted controlled process output variable and said external constraints, where said predicted controlled process output variable is defined by said process model based on said state and this optimising takes place under constraints imposed by said process model and/or said external constraints through adapting said input variables, which provides at least one set point value for each input variable for said prediction time interval, and regulating said separation process by using said set point value in order to influence the separation process for separating the desired material from bulk material, wherein said step of optimising comprises maximising the recovery of the desired material in the separation process or minimising the amount of additives or the amount of energy used.

Another object of the present invention is to provide a device for controlling a material separation process that makes the material separation process more efficient.

This object is according to a second aspect of the present invention achieved through a device for controlling a material separation process, comprising:

a state estimating unit configured to receive at least one measured process output variable in said material separation process that is indicative of the degree of separation between a desired material and an undesired material, and estimate the state of the process at a certain instant in time by applying the measured output variable and external constraints for a prediction time interval on a model of the material separation process, said model being based on at least one input variable that can be manipulated and said output variable, and an optimising unit configured to optimise an objective function that involves at least one predicted controlled process output variable and said external constraints, where said predicted controlled process output variable is defined by said process model based on said state and this optimising takes place under constraints imposed by said process model and/or said external constraints through adapting said input variables, and provide at least one set point value for each input variable for said prediction time interval, for use in regulating said separation process in order to influence the separation process for separating the desired material from bulk material, wherein the optimising unit when optimising the objective function is further configured to maximise the recovery of the desired material in the separation process or minimise the amount of additives or the amount of energy used.

Another object of the present invention is to provide a material separating system that provides a more efficient material separation process.

This object is according to a third aspect of the present invention achieved through a material separating system comprising:
- at least one material separating unit separating desired material from undesired material,
- at least one measuring unit configured to measure at least one process output variable in said material separation process that is indicative of the degree of separation between the desired material and the undesired material
- a state estimating unit configured to estimate the state of the process at a certain instant in time by applying the measured output variable and external constraints for a prediction time interval on a model of the material separation process, said model being based on at least one input variable that can be manipulated and said output variable,
- an optimising unit configured to optimise an objective function that involves at least one predicted controlled process output variable and said external constraints, where said predicted controlled process output variable is defined by said process model based on said state and this optimising takes place under constraints imposed by said process model and/or said external constraints through adapting said input variables, which provides at least one set point value for each input variable for said prediction time interval, and
- at least one regulating unit configured to regulate said separation process by using said set point value in order to influence the separation process for separating the desired material from bulk material,
- wherein the optimising unit when optimising the objective function is further configured to maximise the recovery of the desired material in the separation process or minimise the amount of additives or the amount of energy used.

Another object of the present invention is to provide a computer program product for controlling a material separation process that makes the material separation process more efficient.

This object is according to a fourth aspect of the present invention also achieved through a computer program product for controlling a material separation process, comprising computer program code to make a computer perform when said code is loaded into said computer:
- receive at least one measured process output variable in said material separation process that is indicative of the degree of separation between a desired material and an undesired material,
- estimate the state of the process at a certain instant in time by applying the measured output variable and external constraints for a prediction time interval on a model of the material separation process, said model being based on at least one input variable that can be manipulated and said output variable,
- optimise an objective function that involves at least one predicted controlled process output variable and said external constraints, where said predicted controlled process output variable is defined by said process model based on said state and this optimising takes place under constraints imposed by said process model and/or said external constraints through adapting said input variables, and
- provide at least one set point value for each input variable for said prediction time interval, for use in regulating said separation process in order to influence the separation process for separating the desired material from bulk material,
- wherein the optimising of the objective function comprises maximising the recovery of the desired material in the separation process or minimise the amount of additives or the amount of energy used.

The present invention has many advantages. It provides an efficient material separation process, where a plant is operated at or close to its optimal condition. Furthermore, a high concentration of the desired material is obtained together with a high recovery of the desired material and a low consumption of additives.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF THE INVENTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail. The present invention will in the following be described in relation to a material separation process that is a flotation process. However, it should be realised that the present invention can be applied also on other material separation processes. Material separation is preferably a mineral separation process, where a desired material to be obtained may be any desirable mineral, like iron, copper, zinc, gold, silver etc.

Figure 1:
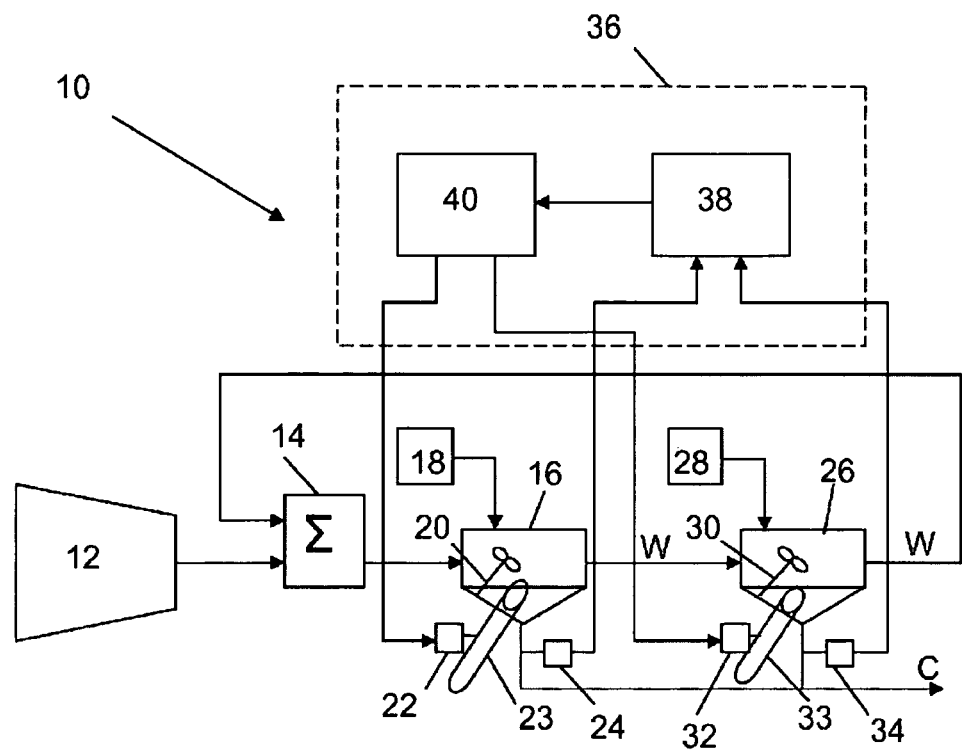
FIG. 1 schematically shows a simplified system for controlling a material separation process according to the present invention.

FIG. 1 schematically shows a simplified exemplifying material separating system 10 according to the present invention, in the form of a simple flotation system. In the system 10 there is provided a fresh feeding unit 12, which provides a first material stream of bulk material, here in the form of pulp comprising a desired material and at least one undesired material. The desired material is here to be separated form the undesired material. The pulp is here furthermore provided in the form of a power. It is possible that the system could include an earlier stage before the feeding unit 12, where this powder was provided through grinding solid bulk material. The fresh feeding unit 12 is connected to a material adding unit 14, where a second material stream is combined with the first material stream. The material adding unit 14 is in turn connected to and supplies the pulp and the material of the second stream to a first material separating unit, here in the form of a first flotation cell 16, which is here a tank that is also denoted a rougher. The first flotation cell 16 contains water and is connected to a first additives supply unit 18 supplying additives to the water in the tank 16, with a first mixer 20 that mixes the water in the tank with the additives from the first additives supply unit 18, and with a first air supply unit 23. The first air supply unit 23 is here connected to a first air regulating unit 22, regulating the amount of air blown into the first flotation cell 16. The first cell 16 has a first outlet where separated output material, also denoted concentrate C is obtained. The output material includes the desired material in a certain ratio to an undesired material, also denoted gangue, in the pulp, and thus provides a certain grade, concentration or purity of the desired material. For a proper material separation process this ratio should be high. Here the first outlet is also provided with a first measuring unit 24, which measures some properties of the output material. This first measuring unit 24 is here preferably a refractometry device. The first cell 16 is also provided with a second outlet, which is connected to the inlet of a second material separating unit, here in the form of a second flotation cell 26. The second flotation cell 26 is here a tank that is also denoted a scavenger. The second flotation cell 26 contains water and is connected to a second additives supply unit 28 supplying additives to the water in the tank 26, with a second mixer 30 that mixes the water in the tank with the additives from the second additives supply unit 28, and with a second air supply unit 33. The second air supply unit 33 is here connected to a second air regulating unit 32, regulating the amount of air blown into the second flotation cell 26. The second cell 26 has a third outlet where output material, i.e. concentrate C is obtained. For these reasons the first and third outlets of the first and the second cells 16 and 26 are connected to each other. Here the third outlet is also provided with a second measuring unit 34, which measures some properties of the material. This measuring unit is here preferably a refractometry device. The second cell is also provided with a second outlet, which is connected to the above described material adding unit 14 in order to provide it with waste material W. This waste material is also denoted as tailings and also includes the desired material in a certain ratio to the undesired material. For a proper material separation process this ratio should be low.

The measurement results of the first and second measuring units 24 and 34 are here provided to a device 36 controlling the material separation process, which in turn provides output signals used to control the first and second regulating units 22 and 32. In order to provide this control, the device 36 is provided with a state estimating unit 38 and an optimising unit 40. The details of this type of control will be discussed shortly.

The functioning of the process controlled will now be described. The fresh feeding unit 12 provides the pulp in the form of powder to the first flotation cell 16 via the material adding unit 14. In the first flotation cell 16, the powder is mixed with water and additives are added from the first additive supply unit 18 through the operation of the first mixer 22. The mixer is like a big beater, which here rotates at a constant speed. Air is furthermore supplied from the first air supply unit 23. Because of this the desired material is separated from the undesired material, attaches itself to air bubbles and rises to the top of the tank in the form of a froth, which is scraped off. The remainder of the material, which is waste or tailings, is formed on the bottom of the cell and supplied to the second flotation cell 26, which applies the same procedure on the waste material in order to separate more desirable material from the undesirable material. The resulting output material, denoted concentrate C may then be supplied to another entity for further treatment, like a smelting plant, while the tailings W from the second cell 26 is provided to the material adding unit 14 in order to be combined with the fresh feed of pulp in order to enhance the recovery of the desired material.

This was just a general description of one material separating process. It should here be realised that the process could be varied in many ways. It is for instance possible that there are several such roughers connected before a scavenger. It should also be realised that there may be more loops of waste leading back to earlier flotation cells as well as several such roughers and scavengers provided in parallel with each other. In its simplest form the plant is only made up of one flotation cell.

Now the general way a device for controlling a material separation process will be described.

In the control a dynamic matrix model of the process is used, which may be expressed as $$F[x(t), x'(t), u(t), t] = 0$$

Where x denotes state variables, u manipulated variables and x'time derivates of state variables. Manipulated variables are here typically those variables that can be influenced by a control system in order to provide control, whereas state variables are variables indicative of the state of the process. Some of these state variables are process output variables. Process output variables can be associated with the grade or tailings but also with the recovery of the desired material. Measurements and estimation of measurable and derivable process output variables can be expressed as $$y(t) = g(x(t), t)$$

This means that a measured output variable y may have a functional relationship g with a state variable x.

The model is also associated with model constraints, e.g. limits for different manipulated variables and/or process output variables:

$$a \leq u_k \geq b$$

$$d \leq x_k \geq e$$

There might also be different more or less complex inequality constraints:

$$C_k(x_k, u_k) \leq 0$$

By using the dynamic model with measured present and perhaps also previous process output variables as parameters, a present or initial state of the process may be estimated.

The state estimation is here carried out using moving horizon estimation (MHE) applied on the above mentioned function with the above mentioned constraints. Thereby a range of set points in the form of target trajectories for the selected controlled process output variables are formulated.

The state estimation is according to the present invention performed in the state estimating unit 38 of the device 36 and performed based on the output variables provided by the first and second measuring units 24 and 34.

After a state has been estimated, an optimization follows, which is performed in the optimising unit 40.

Optimising based on the model above is carried out through minimising an objective function. The objective function is formulated in accordance with the optimising aspects while considering the constraints and is preferably based on a comparison between the target trajectories of the controlled output process variables and controlled process output variables as predicted by the dynamic process model. The optimising can then generally be described as The minimum of $g(x)=\int x(t)dt$.

Thereby optimised target trajectories or a range of set points are obtained which can be used for control. In the flotation plant of FIG. 1 the set points described above generally refer to the control signals used for controlling the air supply to flotation cells. The range of set points takes constraints into account imposed by optimising aspects.

The objective function is formulated in accordance with the optimizing aspects and is preferably based on a comparison between the target set of set points of the controlled process output variables and controlled process output variables as predicted by the dynamic process model. The computation is based on present values of state variables. The objective function is minimized by varying the input trajectories for the manipulated variables. The input trajectories giving the minimum of the objective function is thereby stated to be the optimum input trajectories.

These optimised input trajectories are then used for controlling the process controllable variables. The principles outlined above are described in further detail in WO 03/107103, which is herein incorporated by reference.

For the flotation plant in FIG. 1, the model to be used can be obtained through providing a total model based on each included flotation cell. Each such cell can then be modelled based on $$\frac{dM_p^i}{dt} = -(c_p^i M_p^i + q_t X_t) + c_e^i M_e^i + q_a^i X_a, \; i = A, B \quad (1)$$

$$\frac{dM_e^i}{dt} = -(c_e^i M_e^i + q_c X_c) + c_p^i M_p^i, \; i = A, B \quad (2)$$

where
$M_p^i$ Mass of component i in the pulp.
$M_e^i$ Mass of component I in the froth.
$c_p^i$ Flotation constants 1 for the pulp phase.
$c_e^i$ Drainage constants for the froth.
$X_t$ Mass flow for the tailings.
$q_t^i$ Mass fraction of component i in the tailings.
$X_c$ Mass flow for the concentrate.
$q_c^i$ Mass fraction of component i in the concentrate.
$X_a$ Mass flow for the pulp feed into the cell.
$q_a^i$ Mass fraction of component i in the pulp feed into the cell.

The flotation constants are calculated from:

$$c\frac{i}{p} = c_1^i Q_c(t) + c_0^i, \; i = A, B \quad (3)$$

where $Q_c(t)$ is the normalized amount of added collector agent.

Figure 2:
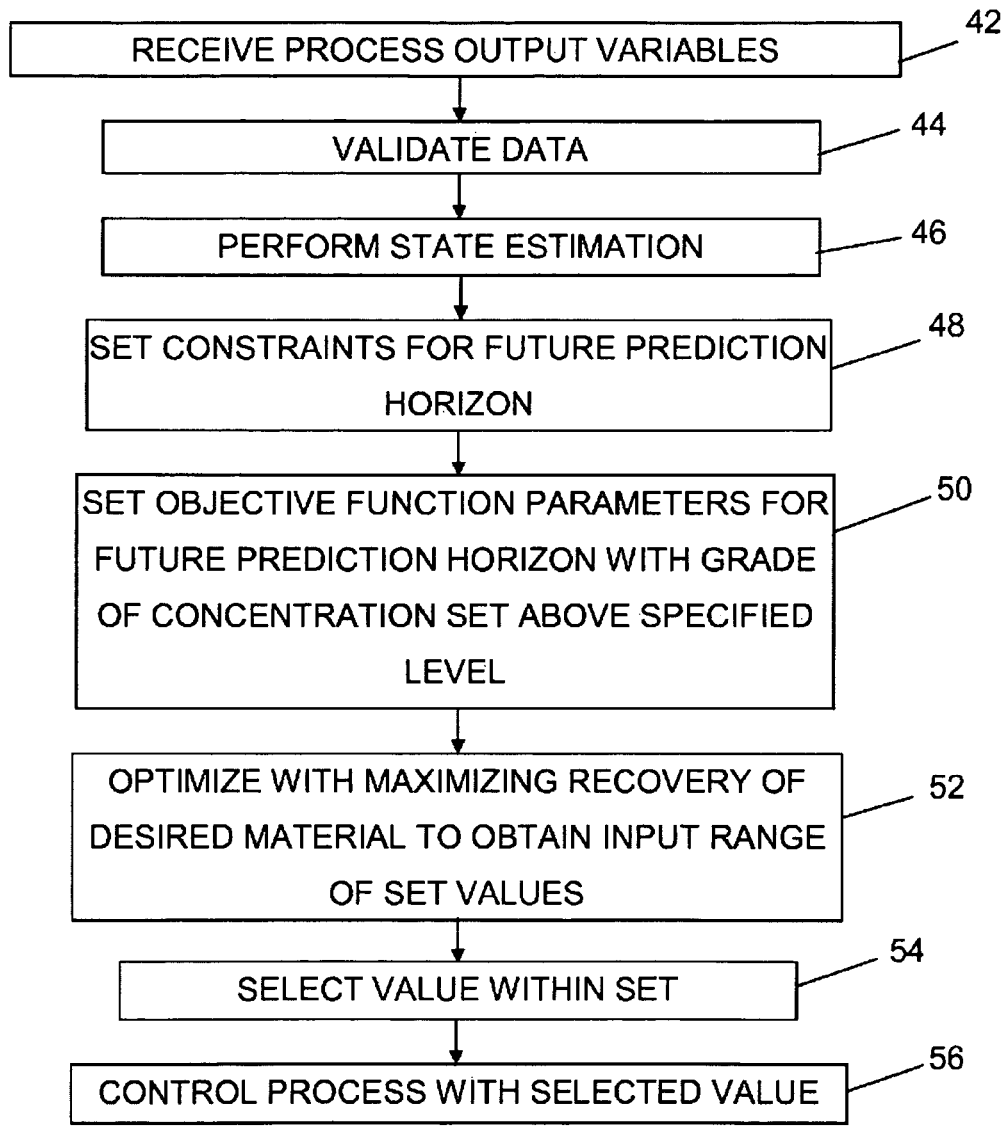
FIG. 2 shows a flow chart outlining the generals method steps for controlling the material separation process according to the present invention, and FIG. 3 schematically shows a computer program product in the form of a CD ROM disc comprising computer program code for carrying out the invention.

A and B her denote the desired material and the undesired material, respectively. Based on these equations for a single cell a total model for the whole plant can then be obtained in dependence on how the cells of the plant are interconnected. How the control is carried out according to the present invention will now be described with reference being made to FIG. 2, which shows a flow chart outlining the general method steps for controlling the material separation process according to the present invention.

With the use of the above described model applied in the way described above for state estimating and optimising, the following steps are run through. In the running process which is described above, process output variables are first received by the state estimating unit, step 42. Thus, in the present invention the output signals from the first and second measuring units 24 and 34 are thus received from these signals it is then possible to determine the grade of concentration of the desired material, i.e. the percentage of the desired material in the output product. This may vary and for some materials 50% is normal. The data is then validated, step 44, and then state estimation is performed for determining an initial state, step 46. Constraints may in this regard be limitations on the feeding force, i.e. how much pulp may be fed in to the first flotation cell that concentrations are to be strictly positive, that the grade is supposed to be a certain number of percent, that the production speed is limited as well as different physical limitations of a cell.

Thereafter constraints for a future prediction horizon are specified, step 48. Normally the same constraints would apply here as are used for the current state. The objective function parameters are then specified for this future horizon, step 50. Here the grade of concentration C of the output product is set to be above a specified level, i.e. the grade is defined as to have a certain minimum content of the desired material. This means that optimising is not made for maximising the grade. Also other variables may be set, like a fixed rotation speed on the mixers 20 and 30. Thereafter the objective function is optimized, by the optimising unit 40, in order to obtain an input range of set values to use in controlling, step 52. The optimisation according to the present invention is here performed in order to maximize the recovery of the desired material of the process, i.e. optimised to obtain as much as possible of the desired material in the output material with regard to the amount of input material fed into the process. With these settings a recovery of about 90% can be achieved. Here the range of set points is associated with variations of the amount of air blown into a cell. When this has been done a value within the range is selected, preferably automatically, step 54, and the process is controlled accordingly, step 56. This is then repeated as long as the process runs.

With this way of controlling the material separation process a more efficient control is provided, where the plant is operated at or close to its optimal condition. Furthermore, a high concentration of the desired material is obtained together with a higher recovery of the desired material and a low consumption of additives. As an alternative it is possible that instead of maximising the recovery, the optimisation is made through minimizing the amount of additives or the amount of energy used. This provides a more economical process.

In order to simplify the control process it is according to one variation of the present invention possible to use a model that is not dynamic but is non-linear instead, for instance a static model.

In a static model there will be no time derivates in the function F. This allows a simpler control of the process. In this case there will also not be a range or set of output values but only one set value for each air supply 23 and 33 that is used for controlling the process. This reduces the amount of processing needed.

Figure 3:
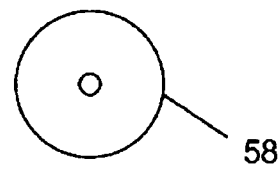

The device 36 for controlling the material separation process is preferably provided in a computer. The state estimating and optimising units of the device may here be implemented through one or more processors together with computer program code for performing their functions. The program code mentioned above may also be provided as a computer program product, for instance in the form of one or more data carriers carrying computer program code for performing the functionality of the present invention when being loaded into the computer. One such carrier 58, in the form of a CD ROM disc is generally outlined in FIG. 3. It is however feasible with other data carriers. The computer program code can furthermore be provided as pure program code on an external server and downloaded to the computer in FIG. 1.

There are several further variations that may be made to the present invention apart from those already mentioned. Above the process was controlled through regulating the amount of air blown into a cell. It is just as well possible to regulate the amount of additives added, either instead of or in combination with the amount of air blown in as well as the froth level in the flotation cell through using a froth level control unit or similar unit in the flotation cell, where the input variables then would influence the set-point of the froth level control unit. The measured output variables need not be the concentrate, but also the waste may be measured, i.e. the amount of desirable material remaining in the tailings. In this regard there may be only one point where measurements are made in the system of FIG. 1. Other types of material separation processes can also be controlled in the same way.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the present invention is only to be limited by the following claims.

The invention claimed is:

1. A device for controlling a material separation process, comprising:
  at least one processor,
  at least one computer-readable medium, and
  a state estimating unit implemented through software stored in the computer-readable medium and programmed to execute on the at least one processor, the software including instructions:
  to receive at least one measured process output variable in said material separation process that is indicative of the degree of separation between a desired material and an undesired material, and
  to estimate the state of the process at a certain instant in time by applying the measured output variable and external constraints for a prediction time interval on a model of the material separation process, said model being based on at least one input variable that can be manipulated and said output variable, and
  an optimising unit implemented through software stored in the computer-readable medium and programmed to execute on the at least one processor, the software including instructions:
  to optimize an objective function that involves at least one predicted controlled process output variable and said external constraints, where said predicted controlled process output variable is defined by said process model based on said state and this optimising takes place under either or both of constraints imposed by said process model and said external constraints through adapting said input variables,
  to provide at least one set point value for each input variable for said prediction time interval, for use in regulating said separation process in order to influence the separation process for separating the desired material from bulk material,
  to, when optimising the objective function, maximise the recovery of the desired material in the separation process or minimise the amount of additives or the amount of energy used.

2. The device according to claim 1, wherein the software implementing the optimising unit further includes instructions to, when optimising the objective function, keep a first set of output variables relating to the degree of separation of desired material from undesired material close to a specified level.

3. The device according to claim 1, wherein the model is dynamic and the software implementing the optimising unit further includes instructions to provide a range of set point values for each input variable, where each range provides input trajectories for said input variables for said prediction time interval.

4. The device according to claim 1, wherein said model is non-linear.

5. The device according to claim 4, wherein said model is a static model.

6. The device according to claim 1, wherein the software implementing the optimising unit further includes instructions to perform optimising repeatedly at fixed consecutive time intervals.

7. A material separating system comprising:
  at least one material separating unit adapted to separate desired material from undesired material,
  at least one measuring unit adapted to measure at least one process output variable in a material separation process that is indicative of the degree of separation between the desired material and the undesired material,
  at least one processor,
  at least one computer-readable medium, and
  a state estimating unit implemented through software stored in the computer-readable medium and programmed to execute on the at least one processor, the software including instructions:
  to estimate the state of the process at a certain instant in time by applying the measured output variable and external constraints for a prediction time interval on a model of the material separation process, said model being based on at least one input variable that can be manipulated and said output variable,
  an optimising unit implemented through software stored in the computer-readable medium and programmed to execute on the at least one processor, the software including instructions:
  to optimize an objective function that involves at least one predicted controlled process output variable and said external constraints, where said predicted controlled process output variable is defined by said process model based on said state and this optimising takes place under either or both of constraints imposed by said process model and said external constraints through adapting said input variables, which provides at least one set point value for each input variable for said prediction time interval, and
  at least one regulating unit implemented through software stored in the computer-readable medium and programmed to execute on the at least one processor, the software including instructions:

to regulate said separation process by using said set point value in order to influence the separation process for separating the desired material from bulk material,
wherein the software implementing the optimising unit further includes instructions to, when optimising the objective function, maximise the recovery of the desired material in the separation process or minimise the amount of additives or the amount of energy used.

8. The material separating system according to claim 7, wherein the material separating unit is supplied with bulk material and is configured to separate the desired material from at least one undesired material, both being provided in the bulk material.

9. The material separating system according to claim 7, further comprising a material adding unit feeding waste material back to the bulk material for taking part in the separation.

10. The material separating system according to claim 9, further comprising at least one mixer for mixing a powder of non-separated materials with a fluid and a separating entity for causing either or both of the desired material to separate from the bulk material and the desired material to float.

11. The material separating system according to claim 10, wherein the separating entity comprises an air supply unit and said input variable controls the air supply unit to blow air into the mixture.

12. The material separating system according to claim 10, wherein the separating entity comprises an additives supply unit and said input variable influences the amount of additives that are added to the mixture.

13. The material separating system according to claim 10, wherein the separating entity comprises a froth level control unit or similar and said input variables influence the setpoint of the froth level control unit.

14. The material separating system according to claim 7, wherein the at least one material separating unit is adapted to perform a flotation process.

15. A device for controlling a material separation process, comprising:
    an input port connectable to at least one measuring unit;
    an output port connectable to at least one process regulating unit;
    at least one processor;
    at least one computer-readable medium; and
    software stored in the at least one computer-readable medium and programmed to execute on the at least one processor, the software including instructions:
        to receive at least one measured process output variable indicative of the degree of separation between a desired material and an undesired material from the input port;
        to apply the measured output variable and at least one external constraint value over a prediction time interval on a model of a material separation process in order to obtain an estimate of the state of the process, the model being based on at least one manipulable input variable and the output variable;
        to predict at least one controlled process output variable based on the model and the estimate of the state of the process;
        to vary the at least one manipulable input variable in an objective function based on one or more of the at least one predicted controlled process output variable, the at least one external constraint value, and constraints imposed by the model in order to maximize the recovery of the desired material in the separation process or minimize the amount of additives or the amount of energy used;
        to provide at least one set point value for the at least one manipulable input variable for the prediction time interval based on the maximizing or the minimizing of the objective function; and
        to send the at least one set point value to the output port for use by the at least one regulating unit to regulate the material separation process.

16. The device of claim 15, wherein the model of a material separation process is based on a plurality of manipulable input variables and the software includes instructions to provide a range of set point values for each manipulable input variable.

17. The device of claim 15, wherein the software executes its instructions repeatedly at fixed consecutive time intervals to send an updated set point value at the fixed consecutive time intervals.

18. The device of claim 15, wherein the at least one set point value controls the regulation of an amount of air to be blown into a flotation cell.

19. The device of claim 15, wherein the at least one set point value controls the regulation of an amount of additives to be added to a flotation cell.

* * * * *